United States Patent
Lee et al.

(10) Patent No.: US 9,363,718 B2
(45) Date of Patent: Jun. 7, 2016

(54) INTER-CELL INTERFERENCE CONTROL METHOD AND APPARATUS

(71) Applicant: Electronics & Telecommunications Research Institute, Daejeon (KR)

(72) Inventors: Seung Que Lee, Daejeon (KR); Byung Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 77 days.

(21) Appl. No.: 14/048,459

(22) Filed: Oct. 8, 2013

(65) Prior Publication Data
US 2014/0162653 A1 Jun. 12, 2014

(30) Foreign Application Priority Data
Dec. 6, 2012 (KR) .................... 10-2012-0141275

(51) Int. Cl.
*H04W 36/00* (2009.01)
*H04W 84/00* (2009.01)

(52) U.S. Cl.
CPC ........ *H04W 36/0061* (2013.01); *H04W 84/005* (2013.01)

(58) Field of Classification Search
CPC .............................. H04W 36/30; H04W 36/32
USPC ....................................................... 455/436
See application file for complete search history.

(56) References Cited

U.S. PATENT DOCUMENTS

| 8,260,206 | B2 | 9/2012 | Damnjanovic | |
|---|---|---|---|---|
| 2007/0021119 | A1* | 1/2007 | Lee et al. | 455/436 |
| 2009/0253448 | A1 | 10/2009 | Kwon et al. | |
| 2010/0248619 | A1* | 9/2010 | Senarath et al. | 455/11.1 |
| 2010/0285831 | A1* | 11/2010 | Jung et al. | 455/524 |
| 2011/0300807 | A1 | 12/2011 | Kwun et al. | |
| 2012/0003962 | A1* | 1/2012 | Jeon et al. | 455/411 |
| 2012/0034925 | A1 | 2/2012 | Noh et al. | |
| 2012/0195298 | A1 | 8/2012 | Kuo | |
| 2013/0143526 | A1* | 6/2013 | Kanugovi et al. | 455/411 |

FOREIGN PATENT DOCUMENTS

| EP | 2469910 A1 | 6/2012 |
|---|---|---|
| KR | 10-2009-0105295 | 10/2009 |

* cited by examiner

Primary Examiner — Justin Lee
(74) Attorney, Agent, or Firm — Nelson Mullins Riley & Scarborough LLP

(57) ABSTRACT

Disclosed is an inter-cell interference control method and apparatus. The inter-cell interference control method includes providing handover request information including interference information to a source base station, receiving handover completion information in accordance with the handover request information from at least one of the source base station and a target base station, and receiving interference control information in accordance with the interference information from the target base station. According to the present invention, inter-cell interference may be efficiently controlled, and overall performance of a network may be improved.

15 Claims, 3 Drawing Sheets

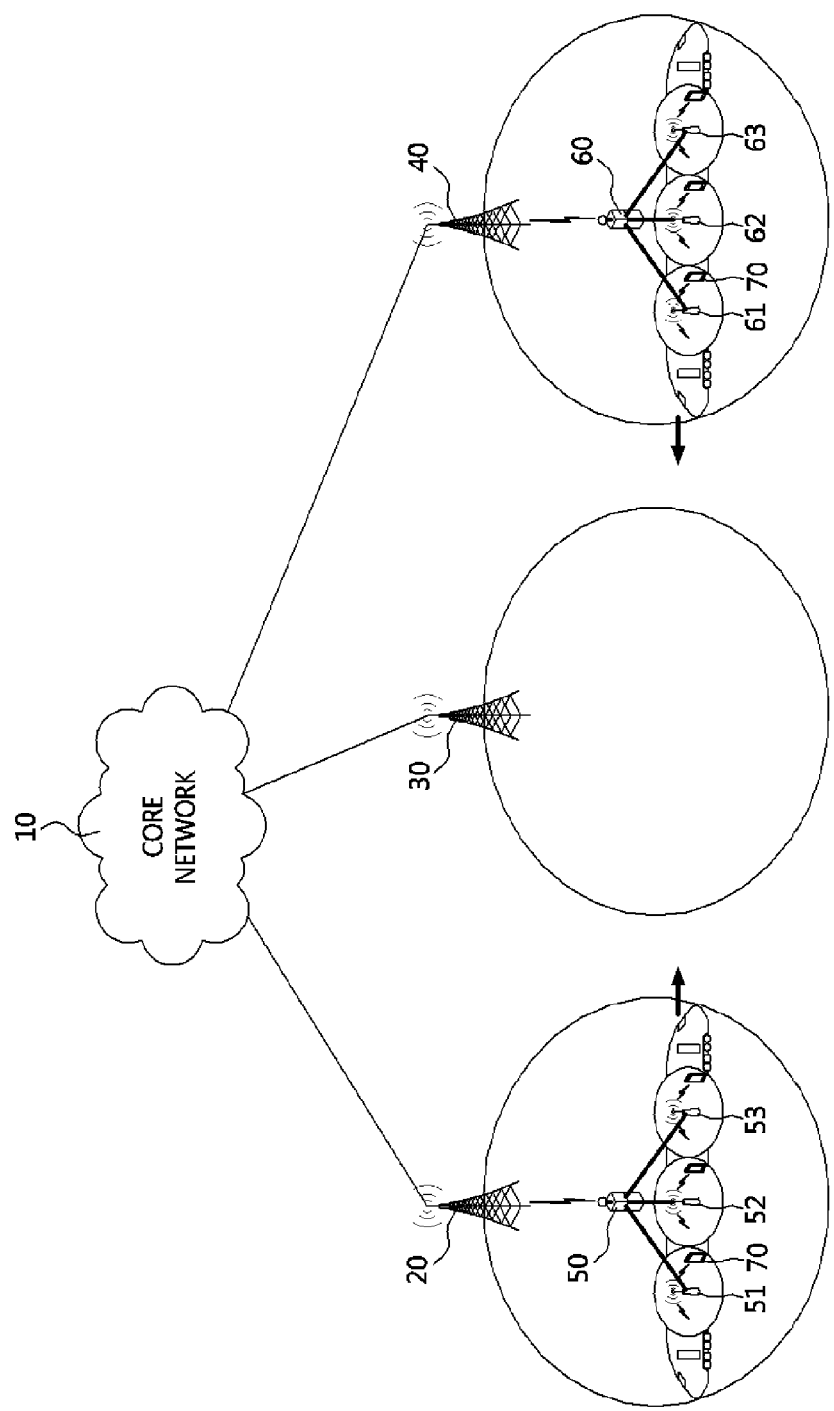

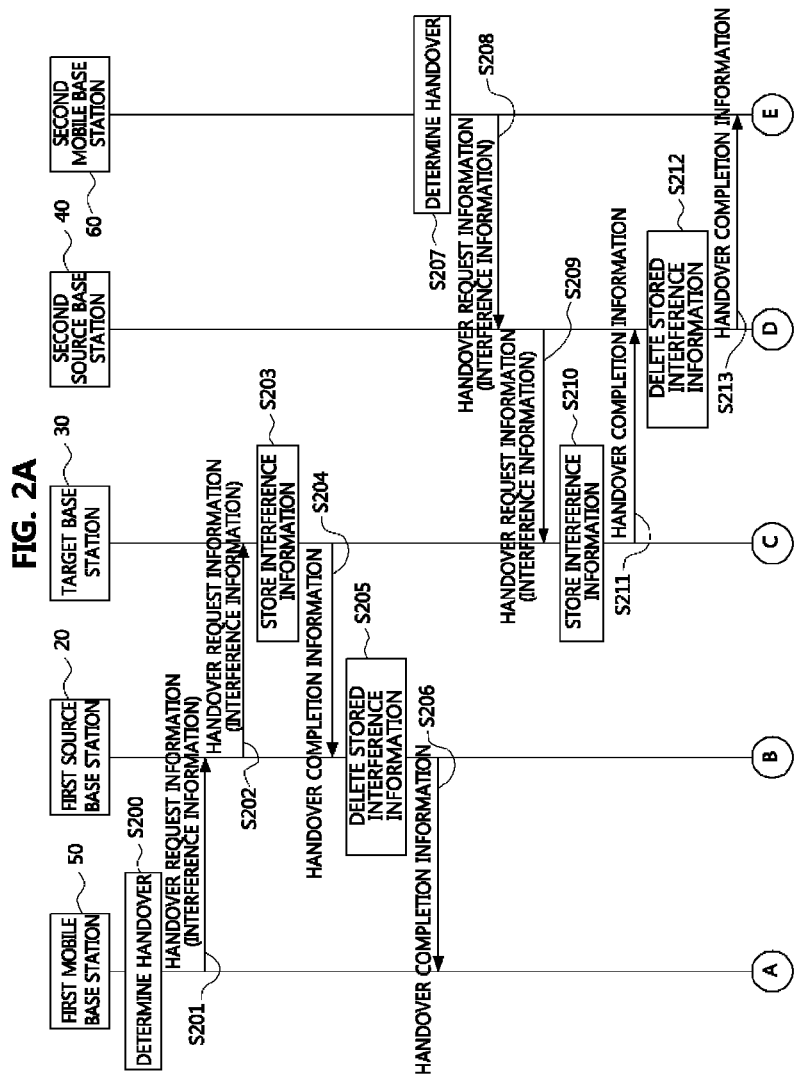

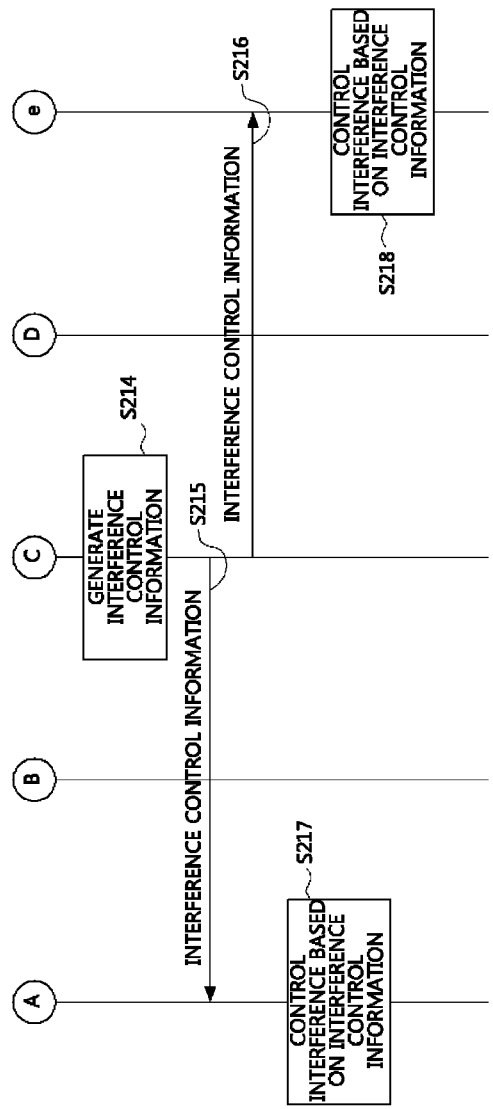

INTER-CELL INTERFERENCE CONTROL METHOD AND APPARATUS

CLAIM FOR PRIORITY

This application claims priority to Korean Patent Application No. 10-2012-0141275 filed on Dec. 6, 2012 in the Korean Intellectual Property Office (KIPO), the entire contents of which are hereby incorporated by reference.

BACKGROUND

1. Technical Field

Example embodiments of the present invention relate in general to an inter-cell interference control method and apparatus and more specifically to an inter-cell interference control method and apparatus which may control inter-cell interference in a communication network environment including a plurality of cells.

2. Related Art

A small cell environment may refer to an environment in which a size of a cell operated by a single base station is about 10 cm to 20 cm, and as representative examples of the small cell, a femtocell, a picocell, and the like may be given. Backhaul of a fixed small cell generally includes an Internet network, and the fixed small cell may connect to a core network through the Internet network. When making a backhaul part of such a small cell wireless (for example, using an existing cellular network instead of the Internet network), services through the small cell may be provided within a moving object such as a train or a bus.

Interference control may refer to control technology for avoiding or minimizing interference which occurs when mutually different cells use the same resources (that is, frequency resources or time resources). As scenarios in which inter-cell interference occurs in a communication network environment in which macro cells and fixed small cells are mixed, interference between a macro cell and a fixed small cell, interference between a single fixed small cell and an adjacent fixed small cell, and the like may be given. In such a communication network environment, since the cell hardly moves once installed, the target of interference is the same, and therefore interference may be controlled based on the same inter-cell interference information.

On the other hand, as scenarios in which inter-cell interference occurs in a communication network environment in which macro cells and mobile small cells are mixed, interference between a macro cell and a mobile small cell, interference between a mobile small cell and an adjacent fixed small cell, interference between a mobile small cell positioned in a single moving object and a mobile small cell positioned in another moving object, and the like may be given. In such a communication network environment, the position of the mobile small cell is constantly changed, and therefore the target of interference is changed each time. As a result, there are demands for inter-cell interference control technologies different from existing inter-cell interference control technologies.

That is, the inter-cell interference control technologies in the conventional communication network environment are technologies which control inter-cell interference under the assumption that the small cell does not move, and therefore inter-cell interference that occurs due to the mobile small cell may not be efficiently controlled.

SUMMARY

Accordingly, example embodiments of the present invention are provided to substantially obviate one or more problems due to limitations and disadvantages of the related art.

Example embodiments of the present invention provide an inter-cell interference control method that controls inter-cell interference which occurs due to a mobile small cell.

Example embodiments of the present invention also provide an inter-cell interference control apparatus that controls inter-cell interference which occurs due to a mobile small cell.

In some example embodiments, an inter-cell interference control method that is performed in a mobile base station includes: providing handover request information including interference information to a source base station; receiving handover completion information in accordance with the handover request information from at least one of the source base station and a target base station; and receiving interference control information in accordance with the interference information from the target base station.

Here, the inter-cell interference control method may further include adjusting at least one of allocation resources and electric power with respect to at least one small base station connected to the mobile base station based on the interference control information.

Also, the providing of the handover request information may include providing, to the source base station, the interference information including at least one of resource information of at least one small base station connected to the mobile base station, electric power information of the at least one small base station, control frame information of the at least one small base station, speed information of the mobile base station, and movement direction information of the mobile base station.

Also, the receiving of the interference control information may include receiving, from the target base station, the interference control information including at least one of an interference control policy and timing information for performing the interference control policy.

In other example embodiments, an inter-cell interference control method that is performed in a source base station includes: providing handover request information including interference information about a mobile base station to a target base station; receiving handover completion information in accordance with the handover request information from the target base station; and deleting the interference information about the mobile base station stored in advance in response to reception of the handover completion information.

Here, the inter-cell interference control method may further include providing the handover completion information to the mobile base station after the deleting of the interference information.

Also, the providing of the handover request information may include providing, to the target base station, the handover request information including the interference information received from the mobile base station.

In still other example embodiments, an inter-cell interference control method that is performed in a target base station includes: receiving handover request information including interference information about a mobile base station from a source base station; providing handover completion information in accordance with the handover request information to at least one of the source base station and the mobile base station; and providing interference control information in accordance with the interference information to the mobile base station.

Here, the providing of the interference control information may include generating the interference control information about the mobile base station based on the interference information, and providing the interference control information to the mobile base station.

Also, the providing of the interference control information may include providing, to the mobile base station, the interference control information including an interference control policy and timing information for performing the interference control policy.

In further example embodiments, an inter-cell interference control method that is performed in a target base station includes: performing handover with respect to a first mobile base station based on handover request information including interference information about the first mobile base station which is received from a first source base station; performing handover with respect to a second mobile base station based on handover request information including interference information about the second mobile base station which is received from the first source base station or the second source base station; and providing interference control information generated based on the interference information about the first mobile base station and the interference information about the second mobile base station to at least one of the first mobile base station and the second mobile base station.

Here, the performing of the handover with respect to the first mobile base station may include receiving the handover request information including the interference information about the first mobile base station from the first source base station, and providing handover completion information in accordance with the handover request information to at least one of the first source base station and the first mobile base station.

Also, the performing of the handover with respect to the second mobile base station may include receiving the handover request information including the interference information about the second mobile base station from the first source base station or the second source base station, and providing handover completion information in accordance with the handover request information to at least one of the first source base station and the second mobile base station or at least one of the second source base station and the second mobile base station.

Also, the providing of the interference control information may include generating at least one of first interference control information about the first mobile base station and second interference control information about the second mobile base station based on the interference information about the first mobile base station and the interference information about the second mobile base station; and providing the first interference control information to the first mobile base station and the second interference control information to the second mobile base station.

Also, the providing of the interference control information may include providing the interference control information including an interference control policy and timing information for performing the interference control policy to at least one of the first mobile base station and the second mobile base station.

BRIEF DESCRIPTION OF DRAWINGS

Example embodiments of the present invention will become more apparent by describing in detail example embodiments of the present invention with reference to the accompanying drawings, in which:

FIG. 1 is a conceptual diagram illustrating a communication network environment; and FIGS. 2A and 2B are flowcharts illustrating an inter-cell interference control method according to an embodiment of the present invention.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

According to the present invention, since inter-cell interference may be controlled based on interference information received from a mobile small cell, interference between a macro cell and a mobile small cell, interference between a mobile small cell and a fixed small cell, and interference between a mobile small cell positioned in a single moving object and a mobile small cell positioned in another moving object may be efficiently controlled, thereby improving overall performance of a network.

FIG. 1 is a conceptual diagram illustrating a communication network environment, and FIGS. 2A and 2B are flowcharts illustrating an inter-cell interference control method according to an embodiment of the present invention.

Referring to FIGS. 1 and 2A and 2B, a communication network environment may include a core network 10, at least one macro base station 20, 30, and 40 connected to the core network 10 in a wired manner, at least one relay base station 50 and 60 connected to the at least one macro base station 20, 30, and 40 in a wireless manner, at least one small base station 51, 52, 53, 61, 62, and 63 connected to the at least one relay base station 50 and 60 in a wired manner, and at least one terminal 70 connected to the at least one small base station 51, 52, 53, 61, 62, and 63 in a wireless manner.

Here, the macro base station (see 20 in FIG. 1) may denote a first source base station (see 20 of FIG. 2), another macro base station (see 30 in FIG. 1) may denote a target base station (see 30 of FIG. 2), still another macro base station (see 40 in FIG. 1) may denote a second source base station (see 40 of FIG. 2), the relay base station (see 50 in FIG. 1) may denote a first mobile base station (see 50 in FIG. 2), and the other relay base station 60 (see 60 in FIG. 1) may denote a second mobile base station (60 in FIG. 2).

Here, the small base stations 51, 52, 53, 61, 62, and 63 may denote a femto base station, a pico base station, and the like.

The relay base stations 50 and 60 and the small base stations 51, 52, 53, 61, 62, and 63 may be installed within moving objects such as trains, cars, and the like, and in this case, users in the moving objects may use communication services through the relay base stations 50 and 60 and the small base stations 51, 52, 53, 61, 62, and 63 even while the moving objects are moving.

The macro base stations 20, 30, and 40 and the relay base stations 50 and 60 may form a network using a wireless communication network, and the small base stations 51, 52, 53, 61, 62, and 63 and the terminal 70 may form a network using a wireless communication network.

The terminal 70 may refer to a mobile station, a mobile terminal, a subscriber station, a portable subscriber station, user equipment, an access terminal, and the like, and include all or part of functions of the terminal, the mobile station, the mobile terminal, the subscriber station, the portable subscriber station, the user equipment, the access terminal, and the like.

Here, as the terminal, a desktop computer enabling communication, a laptop computer, a tablet PC, a wireless phone, a mobile phone, a smart phone, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, and the like may be used.

The base station may refer to an access point, a radio access station, a Node B, an evolved Node B, a base transceiver station, a mobile multihop relay (MMR)-BS, and the like, and include all or part of functions of the base station, the access point, the radio access station, the Node B, and the evolved Node B, the base transceiver station, the MMR-BS, and the like.

An inter-cell interference control method according to an embodiment of the present invention may be applied to ① a case in which a single mobile base station executes handover to a target base station, ② a case in which a plurality of mobile base stations execute handover to a target base station, and the like.

Case in which Single Mobile Base Station Executes Handover to Target Base Station (Scenario 1)

Hereinafter, the inter-cell interference control method that is applied to a case in which the first mobile base station 50 executes handover from the first source base station 20 to the target base station 30 will be described in detail.

In operation S200, the first mobile base station 50 may determine whether handover is executed based on signals received from a plurality of base stations. The first mobile base station 50 may determine whether handover is executed based on technologies in accordance with communication standards.

In operation S201, when it is determined that handover to the target base station 30 is executed, the first mobile base station 50 may provide handover request information including interference information to the first source base station 20. The interference information may include at least one of resource information (that is, frequency resource allocation information, time resource allocation information, and the like) of the at least one small base station 51, 52, and 53 connected to the first mobile base station 50, electric power information (that is, transmission power information) of the at least one small base station 51, 52, and 53, control frame information about the at least one small base station 51, 52, and 53, speed information (that is, speed information of a moving object in which the first mobile base station 50 is installed) of the first mobile base station 50, and movement direction information (that is, movement direction information of a moving object in which the first mobile base station 50 is installed) of the first mobile base station 50.

In operation S202, the first source base station 20 that has received the handover request information including the interference information from the first mobile base station 50 may provide handover request information including the interference information to the target base station 30.

In operation S203, the target base station 30 that has received the handover request information including the interference information about the first mobile base station 50 from the first source base station 20 may execute handover with respect to the first mobile base station 50, and store the interference information about the first mobile base station 50.

In operation S204, when handover with respect to the first mobile base station 50 is completed, the target base station 30 may provide handover completion information indicating completion of the handover to at least one of the first source base station 20 and the first mobile base station 50.

The first source base station 20 that has received the handover completion information from the target base station 30 may delete the interference information about the first mobile base station 50 stored in advance in operation S205, and provide the handover completion information to the first mobile base station 50 in operation S206. In operation S205, the first source base station 20 should delete the interference information about the first mobile base station 50 stored in advance.

Next, in operation S214, the target base station 30 may generate interference control information about the first mobile base station 50. In this instance, the target base station 30 may generate the interference control information about the first mobile base station 50 based on resource and power information about the target base station 30, resource and power information about a fixed base station (not shown) positioned within a cell range of the target base station 30, and the interference information about the first mobile base station 50.

For example, the target base station 30 may calculate a timing when the first mobile base station 50 is positioned at an arbitrary point within the cell range of the target base station 30 and a timing when the first mobile base station 50 is positioned at an arbitrary point within a cell range of the fixed base station positioned within the cell range of the target base station 30 based on the speed information and movement direction information of the first mobile base station 50 included in the interference information of the first mobile base station 50.

The target base station 30 may generate an interference control policy that can prevent or minimize interference with the first mobile base station 50 at the calculated timing based on the resource and power information about the target base station 30 and the resource and power information about the fixed base station positioned within the cell range of the target base station 30. Here, the interference control policy may include resource information about the first mobile base station 50, power information about the first mobile base station, and the like. Thus, the target base station 30 may generate the interference control information about the first mobile base station which includes the interference control policy, and timing information (that is, timing information for executing the interference control information).

Here, the method of generating the interference control information and types of information included in the interference control information are not limited to the above description, and the target base station 30 may generate the interference control information using a known method.

In operation S215, after generating the interference control information about the first mobile base station 50, the target base station 30 may provide the interference control information to the first mobile base station 50.

In operation S217, the first mobile base station 50 that has received the interference control information from the target base station 30 may provide resource allocation information generated based on the interference control information to the small base stations 51, 52, and 53 connected to the first mobile base station 50. The small base stations 51, 52, and 53 that have received the resource allocation information may form a network with a terminal 70 using resources (that is, frequency resources and time resources) designated at a specific timing based on the resource allocation information, and electric power (that is, magnitude of transmission power).

Case in which Plurality of Mobile Base Stations Execute Handover to Target Base Station (Scenario 2)

Hereinafter, the inter-cell interference control method that is applied to a case in which the first mobile base station 50 executes handover from the first source base station 20 to the target base station 30 and the second mobile base station 40 executes handover from the first source base station 20 or the second source base station 40 to the target base station 30 will be described in detail.

The inter-cell interference control method may include operations (S200, S201, S202, S203, S204, S205, and S206) of executing handover between the first mobile base station 50 and the target base station 30, operations (S207, S208, S209, S210, S211, S212, and S213) of executing handover between the second mobile base station 60 and the target base station 30, and operations (S214, S215, S216, S217, and S218) controlling interference that occurs due to the first mobile base station 50 and the second mobile base station 60. In addition, the inter-cell interference control method may further include an operation (not shown) of controlling the interference that occurs due to the first mobile base station 50 after executing handover between the first mobile base station 50 and the target base station 30.

In operation S200, the first mobile base station 50 may determine whether handover is executed based on signals received from a plurality of base stations. The first mobile base station 50 may determine whether handover is executed based on technologies in accordance with communication standards.

In operation S201, when it is determined that handover to the target base station is executed, the first mobile base station 50 may provide handover request information including interference information to the first source base station 20. The interference information may include at least one of resource information (that is, frequency resource allocation information, time resource allocation information, and the like) of the at least one small base station 51, 52, and 53 connected to the first mobile base station 50, electric power information (that is, transmission power information) of the at least one small base station 51, 52, and 53, control frame information about the at least one small base station 51, 52, and 53, speed information (that is, speed information of a moving object in which the first mobile base station 50 is installed) of the first mobile base station 50, and movement direction information (that is, movement direction information of the moving object in which the first mobile base station 50 is installed) of the first mobile base station 50.

In operation S202, the first source base station 20 that has received the handover request information including the interference information from the first mobile base station 50 may provide the handover request information including the interference information to the target base station 30.

In operation S203, the target base station 30 that has received the handover request information including the interference information about the first mobile base station 50 from the first source base station 20 may execute handover with respect to the first mobile base station 50, and store the interference information about the first mobile base station 50.

In operation S204, when handover with respect to the first mobile base station 50 is completed, the target base station 30 may provide handover completion information indicating completion of the handover to at least one of the first source base station 20 and the first mobile base station 50.

The first source base station 20 that has received the handover completion information from the target base station 30 may delete the interference information about the first mobile base station 50 stored in advance in operation S205, and provide the handover completion information to the first mobile base station 50 in operation S206. In operation S205, the first source base station 20 should delete the interference information about the first mobile base station 50 stored in advance.

Interference that occurs due to the first mobile base station 50 after handover between the first mobile base station 50 and the target base station 30 is executed may be controlled. That is, the target base station 30 may generate interference control information about the first mobile base station 50 and provide the generated interference control information to the first mobile base station 50, and the first mobile base station 50 may control interference based on the interference control information. Here, the target base station 30 may generate interference control information about the first mobile base station 50 in accordance with operation S214 of the above-described 'scenario 1' and provide the interference control information to the first mobile base station 50 in accordance with operation S215 of the above-described 'scenario 1,' and the first mobile base station 50 may control the interference in accordance with operation S217 of the above-described 'scenario 1.'

After handover between the first mobile base station 50 and the target base station 30 is executed or after the interference that occurs due to the first mobile base station 50 is controlled, handover between the second mobile base station 60 and the target base station 30 may be executed. The second mobile base station 60 may determine whether handover to the target base station 30 is executed in operation S207, and determine whether the handover is executed in accordance with the above-described operation S200.

In operation S208, the second mobile base station 60 may provide handover request information including interference information about the second mobile base station 60 to the second source base station 40 after determining whether the handover to the target base station 30 is executed. Meanwhile, when the second mobile base station 60 is positioned within a cell range of the first source base station 20 (that is, when the second mobile base station 60 is positioned in the same cell as the cell in which the first mobile base station 50 is positioned) the second mobile base station 60 may provide the handover request information including the interference information about the second mobile base station 60 to the first source base station 20.

Here, the interference information about the second mobile base station 60 may include at least one of resource information (that is, frequency resource allocation information, time resource allocation information, and the like) of the at least one small base station 61, 62, and 63 connected to the second mobile base station 60, electric power information (that is, transmission power information) of the at least one small base station 61, 62, and 63, control frame information about the at least one small base station 61, 62, and 63, speed information (that is, speed information of a moving object in which the second mobile base station 60 is installed) of the second mobile base station 60, and movement direction information (that is, movement direction information of the moving object in which the second mobile base station 60 is installed) of the second mobile base station 60.

In operation S209, the first source base station 20 or the second source base station 40 that has received the handover request information including the interference information about the second mobile base station 60 from the second mobile base station 60 may provide the handover request information including the interference information about the second mobile base station 60 to the target base station 30.

In operation S210, the target base station 30 that has received the handover request information including the interference information about the second mobile base station 60 from the first source base station 20 or the second source base station 40 may execute handover with respect to the second mobile base station 60, and store the interference information about the second mobile base station 60.

In operation S211, when handover with respect to the second mobile base station 60 is completed, the target base station 30 may provide handover completion information indicating completion of the handover to at least one of the first source base station 20 and the second mobile base station 60 or at least one of the second source base station 40 and the second mobile base station 60.

The first source base station 20 or the second source base station 40 that has received the handover completion information from the target base station 30 may delete the interference information about the second mobile base station 60 stored in advance in operation S212, and provide the handover completion information to the second mobile base station 60 in operation S213. In operation S212, the first source base station 20 or the second source base station 40 should delete the interference information about the first mobile base station 50 stored in advance.

Next, in operation S214, the target base station 30 may generate first interference control information about the first mobile base station 50 and second interference control information about the second mobile base station 60. That is, the target base station 30 may generate only the first interference control information and control the first mobile base station 50 through the first interference control information, so that interference that occurs among the target base station 30, the fixed base station positioned within the cell range of the target base station 30, the first mobile base station 50, and the second mobile base station 60 can be controlled.

In addition, the target base station 30 may generate only the second interference control information and control the second mobile base station 60 through the second interference control information, so that interference that occurs among the target base station 30, the fixed base station positioned within the cell range of the target base station 30, the first mobile base station 50, and the second mobile base station 60 can be controlled.

In addition, the target base station 30 may generate the first interference control information and the second interference control information, and control the first mobile base station 50 through the first interference control information and second mobile base station 60 through the second interference control information, so that interference that occurs among the target base station 30, the fixed base station positioned within the cell range of the target base station 30, the first mobile base station 50, and the second mobile base station 60 can be controlled.

The target base station 30 may generate at least one of interference control information about the first mobile base station 50 and interference control information about the second mobile base station 60 based on resource and power information about the target base station 30, resource and power information about the fixed base station (not shown) positioned within the cell range of the target base station 30, the interference information about the first mobile base station 50, the interference information about the second mobile base station 60, and the like.

For example, the target base station 30 may calculate a timing when the first mobile base station 50 is positioned at an arbitrary point within the cell range of the target base station 30, a timing when the second mobile base station 60 is positioned in an arbitrary point within the cell range of the target base station 30, a timing when the first mobile base station 50 is positioned at an arbitrary point within a cell range of the fixed base station positioned within the cell range of the target base station 30, a timing when the second mobile base station 60 is positioned at an arbitrary point within the cell range of the fixed base station positioned within the cell range of the target base station 30, a timing when the first mobile base station 50 and the second mobile base station 60 cross within the cell range of the target base station 30, and the like based on the speed and movement direction information of the first mobile base station 50 included in the interference information of the first mobile base station 50 and the speed and movement direction information of the second mobile base station 60 included in the interference information of the second mobile base station 60.

The target base station 30 may generate at least one of a first interference control policy for the first mobile base station 50 and a second interference control policy for the second mobile base station 60 which can avoid or minimize interference among the target base station 30, the fixed base station positioned within the cell range of the target base station 30, the first mobile base station 50, and the second mobile base station 60 at the calculated timing, based on the resource and power information about the target base station 30 and the resource and power information about the fixed base station positioned within the cell range of the target base station 30.

The first interference control policy may include the resource and power information about the first mobile base station 50, and the like. Based on this, the target base station 30 may generate the first interference control information about the first mobile base station 50 including the first interference control policy, timing information (that is, timing information for executing the first interference control policy), and the like.

The second interference control policy may include the resource and power information about the second mobile base station 60, and the like. Based on this, the target base station 30 may generate the second interference control information about the second mobile base station 60 including the second interference control policy, timing information (that is, timing information for executing the second interference control policy), and the like.

Here, the method of generating the interference control information and types of information included in the interference control information are not limited to the above descriptions, and the target base station 30 may generate the interference control information using a known method.

After generating at least one of the first interference control information about the first mobile base station 50 and the second interference control information about the second mobile base station 60, the target base station 30 may provide the first interference control information about the first mobile base station 50 to the mobile base station 50 and the second interference control information about the second mobile base station 60 to the second mobile base station 60 in operation S216. Here, the target base station 30 may provide the second interference control information about the second mobile base station 60 to the second mobile base station 60, and then provide the first interference control information about the first mobile base station 50 to the first mobile base station 50.

In operation S217, the first mobile base station 50 that has received the first interference control information from the target base station 30 may provide resource allocation information in accordance with the first interference control information to the small base stations 51, 52, and 53 connected to the first mobile base station 50. The small base stations 51, 52, and 53 that have received the resource allocation information may form a network with the terminal 70 using resources (that is, frequency resources and time resources) designated at a specific timing based on the resource allocation information and power (that is, magnitude of transmission power).

In operation S218, the second mobile base station 60 that has received the second interference control information from the target base station 30 may provide resource allocation information in accordance with the second interference control information to the small base stations 61, 62, and 63 connected to the second mobile base station 60. The small base stations 61, 62, and 63 that have received the resource allocation information may form a network with the terminal 70 using resources (that is, frequency resources and time resources) designated at a specific timing based on the resource allocation information and power (that is, magnitude of transmission power).

The inter-cell interference control method according to an embodiment of the present invention has been described above in detail. Hereinafter, an inter-cell interference control apparatus according to an embodiment of the present invention will be described in detail.

The mobile base station for performing the inter-cell interference control method may determine whether handover to the target base station is executed, and provide, to the source base station, handover request information including interference information about the mobile base station when it is determined that handover is executed. Here, the interference information may include at least one of resource information (that is, frequency resource allocation information, time resource allocation information, and the like) of at least one small base station connected to the mobile base station, electric power information (that is, transmission power information) of the at least one small base station, control frame information about the at least one small base station, speed information (that is, speed information of a moving object in which the mobile base station is installed) of the mobile base station, and movement direction information (that is, movement direction information of the moving object in which the mobile base station is installed) of the mobile base station.

The mobile base station may receive handover completion information in accordance with the handover request information from at least one of the source base station and the target base station, receive interference control information in accordance with the interference information from the target base station, and control interference based on the interference control information. Here, the interference control information may include an interference control policy, timing information (that is, timing information for the executing interference control policy), and the like.

Here, the mobile base station may determine whether handover is executed in accordance with the above-described operation S200 or S207, provide the handover request information including the interference information to the source base station in accordance with the above-described operation S201 or S208, receive handover completion information from at least one of the source base station and the target base station in accordance with the above-described operation S206 or S213, receive the interference control information from the target base station in accordance with the above-described operation S215 or S216, and control interference in accordance with the above-described operation S217 or S218.

Functions performed by the mobile base station may be substantially performed in a processor, and operations S200, S201, S206, S207, S208, S213, S215, S216, S217, and S218 which are shown in FIGS. 2A and 2B may be performed in the processor.

The source base station for performing the inter-cell interference control method may receive handover request information including interference information about the mobile base station from the mobile base station, provide the handover request information including the interference information about the mobile base station to the target base station, receive handover completion information in accordance with the handover request information from the target base station, delete the interference information about the mobile base station stored in advance in response to reception of the handover completion information, and provide the handover completion information to the mobile base station.

Here, the source base station may receive the handover request information from the mobile base station in accordance with the above-described operation S210 or S208, provide the handover request information to the target base station in accordance with the above-described operation S202 or S209, receive the handover completion information from the target base station in accordance with the above-described operation S204 or S211, delete the interference information stored in advance in accordance with the above-described operation S205 or S212, and provide the handover completion information to the mobile base station in accordance with the above-described operation S206 or S213.

Functions performed by the source base station may be substantially performed in a processor, and operations S201, S202, S204, S205, S206, S208, S209, S211, S212, and S213 which are shown in FIGS. 2A and 2B may be performed in the processor.

The target base station for performing the inter-cell interference control method may receive handover request information including interference information about the mobile base station from the source base station, store the received interference information, execute handover with respect to the mobile base station in accordance with the handover request information, provide handover completion information indicating completion of handover to at least one of the source base station and the mobile base station, generate interference control information about the mobile base station based on the interference information, and provide the generated interference control information to the mobile base station.

Here, the target base station may receive the handover request information from the source base station in accordance with the above-described operation S202 or S209, store the interference information in accordance with the above-described operation S203 or S210, provide the handover completion information to at least one of the source base station and the mobile base station in accordance with the above-described operation S204 or S211, generate the interference control information in accordance with the above-described operation S214, and provide the interference control information to the mobile base station in accordance with the above-described operation S215 or S216.

Functions performed by the target base station may be substantially performed in a processor, and operations S202, S203, S204, S209, S210, S211, S214, S215, and S216 which are shown in FIGS. 2A and 2B may be performed in the processor.

The inter-cell interference control method according to the present invention may be realized in a form of a computer program that can be executed by various kinds of computers by being recorded in a computer-readable medium. The computer-readable medium may include a program, a data file, a data structure or the like singly or in combination. The program recorded in the medium may be specially designed for the present invention or may be already known and available to those skilled in the computer industry. The computer readable recording medium may be a variety of semiconductor memory devices for storing and executing a program such as Read-Only Memory (ROM), Random Access Memory (RAM) and flash memory. The media may also be a transmission medium such as an optical fiber, a metal line or a waveguide for transmitting a carrier signal that represents a program, a data structure and the like. The program may be coded in a machine language code using, e.g., an assembly or a compiler or a high-level language that is computer-executable by an interpreter or the like. Further, the hardware may be configured to operate as one or more software modules for performing the operations in the method of the present invention, and vice versa.

While the example embodiments of the present invention and their advantages have been described in detail, it should be understood that various changes, substitutions and alterations may be made herein without departing from the scope of the invention.

What is claimed is:

1. An inter-cell interference control method that is performed in a mobile base station, comprising:
providing handover request information including interference information to a source base station;
receiving handover completion information in accordance with the handover request information from at least one of the source base station and a target base station;
receiving interference control information in accordance with the interference information from the target base station;
forming a network with a terminal based on the interference control information, wherein the interference control information comprises allocation resources designated at a specific timing; and
adjusting a frequency resource designated at the specific timing or a time resource designated at the specific timing with respect to a small base station connected to the mobile base station based on the interference control information.

2. The inter-cell interference control method of claim 1, further comprising:
adjusting at least one of the allocation resources and electric power with respect to at least one small base station connected to the mobile base station based on the interference control information.

3. The inter-cell interference control method of claim 1, wherein the providing of the handover request information includes providing, to the source base station, the interference information including at least one of resource information of at least one small base station connected to the mobile base station, electric power information of the at least one small base station, control frame information of the at least one small base station, speed information of the mobile base station, and movement direction information of the mobile base station.

4. The inter-cell interference control method of claim 1, wherein the receiving of the interference control information includes receiving, from the target base station, the interference control information including at least one of an interference control policy and timing information for performing the interference control policy.

5. An inter-cell interference control method that is performed in a source base station, comprising:
receiving handover request information including interference information, electric power information, a control frame, speed information of a mobile base station, and movement direction information of the mobile base station from the mobile base station;
providing the handover request information including the interference information, the electric power information, the control frame, the speed information, and the movement direction information to a target base station;

receiving handover completion information in accordance with the handover request information from the target base station; and deleting the interference information about the mobile base station stored in advance in response to reception of the handover completion information.

6. The inter-cell interference control method of claim 5, further comprising:

providing the handover completion information to the mobile base station after the deleting of the interference information.

7. The inter-cell interference control method of claim 5, wherein the providing of the handover request information includes providing, to the target base station, the handover request information including the interference information received from the mobile base station.

8. An inter-cell interference control method that is performed in a target base station, comprising:

receiving handover request information including interference information about a mobile base station from a source base station;

providing handover completion information in accordance with the handover request information to at least one of the source base station and the mobile base station;

providing interference control information in accordance with the interference information to the mobile base station;

forming a network with a terminal based on the interference control information, wherein the interference control information comprises allocation resources designated at a specific timing; and adjusting a frequency resource designated at the specific timing or a time resource designated at the specific timing with respect to a small base station connected to the mobile base station based on the interference control information.

9. The inter-cell interference control method of claim 8, wherein the providing of the interference control information includes generating the interference control information about the mobile base station based on the interference information, and providing the interference control information to the mobile base station.

10. The inter-cell interference control method of claim 8, wherein the providing of the interference control information includes providing, to the mobile base station, the interference control information including an interference control policy and timing information for performing the interference control policy.

11. An inter-cell interference control method that is performed in a target base station, comprising:

performing handover with respect to a first mobile base station based on handover request information including interference information about the first mobile base station which is received from a first source base station;

performing handover with respect to a second mobile base station based on handover request information including interference information about the second mobile base station which is received from the first source base station or the second source base station;

providing interference control information generated based on the interference information about the first mobile base station and the interference information about the second mobile base station to at least one of the first mobile base station and the second mobile base station;

forming a network with a terminal based on the interference control information, wherein the interference control information comprises allocation resources designated at a specific timing; and adjusting a frequency resource designated at the specific timing or a time resource designated at the specific timing with respect to a small base station connected to at least one of the first mobile base station and the second mobile base station based on the interference control information.

12. The inter-cell interference control method of claim 11, wherein the performing of the handover with respect to the first mobile base station includes receiving the handover request information including the interference information about the first mobile base station from the first source base station, and providing handover completion information in accordance with the handover request information to at least one of the first source base station and the first mobile base station.

13. The inter-cell interference control method of claim 11, wherein the performing of the handover with respect to the second mobile base station includes receiving the handover request information including the interference information about the second mobile base station from the first source base station or the second source base station, and providing handover completion information in accordance with the handover request information to at least one of the first source base station and the second mobile base station or at least one of the second source base station and the second mobile base station.

14. The inter-cell interference control method of claim 11, wherein the providing of the interference control information includes generating at least one of first interference control information about the first mobile base station and second interference control information about the second mobile base station based on the interference information about the first mobile base station and the interference information about the second mobile base station; and providing the first interference control information to the first mobile base station and the second interference control information to the second mobile base station.

15. The inter-cell interference control method of claim 11, wherein the providing of the interference control information includes providing the interference control information including an interference control policy and timing information for performing the interference control policy to at least one of the first mobile base station and the second mobile base station.

* * * * *